US011604351B1

(12) United States Patent
Elazhary et al.

(10) Patent No.: US 11,604,351 B1
(45) Date of Patent: Mar. 14, 2023

(54) FIELD BIAS OPTICAL ELEMENT FOR DIGITAL PROJECTOR

(71) Applicant: Meta Platforms Technologies, LLC, Menlo Park, CA (US)

(72) Inventors: Tamer Elazhary, Redmond, WA (US); Yang Zhao, Kirkland, WA (US); Nicholas Daniel Trail, Bothell, WA (US); Byron Taylor, Sammamish, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 75 days.

(21) Appl. No.: 16/878,432

(22) Filed: May 19, 2020

(51) Int. Cl.
*G02B 27/01* (2006.01)
*H04N 13/363* (2018.01)

(52) U.S. Cl.
CPC ....... *G02B 27/0172* (2013.01); *H04N 13/363* (2018.05); *G02B 2027/013* (2013.01); *G02B 2027/014* (2013.01); *G02B 2027/0138* (2013.01); *G02B 2027/0178* (2013.01)

(58) Field of Classification Search
CPC ............ G02B 27/0172; G02B 27/0178; G02B 27/013; G02B 27/0138; G02B 27/014; H04N 13/363
See application file for complete search history.

(56) References Cited

U.S. PATENT DOCUMENTS

| 2004/0008993 | A1* | 1/2004 | Tai | H04B 10/2569 398/147 |
|---|---|---|---|---|
| 2013/0222384 | A1* | 8/2013 | Futterer | H04N 13/344 345/426 |
| 2016/0252727 | A1* | 9/2016 | Mack | G02B 27/0172 345/8 |
| 2018/0149873 | A1* | 5/2018 | Edwin | G02B 6/0023 |
| 2018/0275411 | A1* | 9/2018 | Schowengerdt | G02B 6/0016 |
| 2019/0235266 | A1* | 8/2019 | Ide | G02B 27/0081 |
| 2019/0310482 | A1* | 10/2019 | Schultz | G02B 5/04 |
| 2020/0012095 | A1* | 1/2020 | Edwin | G02B 6/0031 |
| 2020/0142203 | A1* | 5/2020 | Moore | G02B 27/0176 |
| 2021/0011339 | A1* | 1/2021 | Yang | G02F 1/133616 |
| 2021/0157108 | A1* | 5/2021 | Aikio | G02B 27/0081 |

* cited by examiner

*Primary Examiner* — Mark Edwards
(74) *Attorney, Agent, or Firm* — Freestone Intellectual Property Law PLLC; Aaron J. Visbeek

(57) ABSTRACT

An optical assembly for a digital projector includes a lens and a field bias optical element. The lens is disposed to receive display light generated by a display and to direct the display light along an optical path. The lens is configured to provide a first field-of-view. The field bias optical element is disposed between the lens and an aperture stop of the optical assembly. The field bias optical element is configured to bias the display light in at least one direction to provide a second field-of-view that is greater than the first field-of-view.

19 Claims, 7 Drawing Sheets

FIELD BIAS OPTICAL ELEMENT FOR DIGITAL PROJECTOR

BACKGROUND INFORMATION

A smart device is an electronic device that typically communicates with other devices or networks. In some situations the smart device may be configured to operate interactively with a user. A smart device may be designed to support a variety of form factors, such as a head mounted device, a head mounted display (HMD), or a smart display, just to name a few.

Smart devices may include one or more electronic components for use in a variety of applications, such as gaming, aviation, engineering, medicine, entertainment, video/audio chat, activity tracking, and so on. In some examples, a smart device, such as a head-mounted device or HMD, may include a digital projector for presenting data, information, images, or other virtual graphics to the user. However, various contexts may generate challenges to presenting the virtual graphics to the user. In particular, various optical elements (e.g., lenses) and their positioning with respect to the digital projector may induce optical aberrations that distort the virtual graphics.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Embodiments of a digital projector, optical assembly for a digital projector, and a head mounted device are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In some implementations of the disclosure, the term "near-eye" may be defined as including an element that is configured to be placed within 50 mm of an eye of a user while a near-eye device is being utilized. Therefore, a "near-eye optical element" or a "near-eye system" would include one or more elements configured to be placed within 50 mm of the eye of the user.

Figure 1:
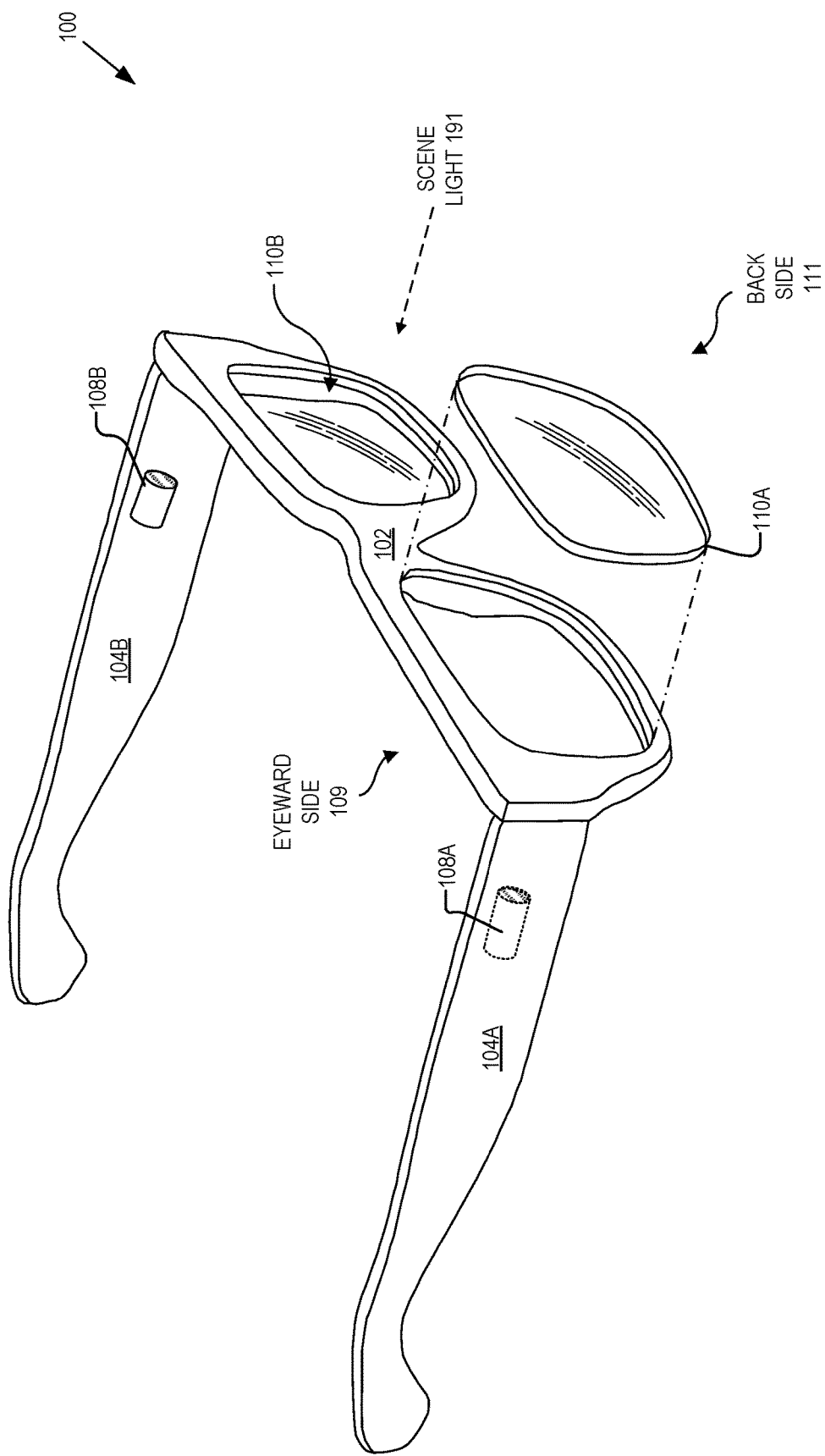
FIG. 1 illustrates an example head mounted device, in accordance with aspects of the present disclosure.

FIG. 1 illustrates an example head-mounted device 100, in accordance with aspects of the present disclosure. A head-mounted device, such as head-mounted device 100, is one type of smart device, typically worn on the head of a user to provide artificial reality content to a user. Artificial reality is a form of reality that has been adjusted in some manner before presentation to the user, which may include, e.g., virtual reality (VR), augmented reality (AR), mixed reality (MR), hybrid reality, or some combination and/or derivative thereof.

The illustrated example of head-mounted device 100 is shown as including a frame 102, temple arms 104A and 104B, near-eye optical elements 110A and 110B, and digital projectors 108A and 108B. Digital projectors 108A and 108B are shown as coupled to temple arms 104A and 104B, respectively.

FIG. 1 illustrates near-eye optical elements 110A and 110B that are configured to be mounted to the frame 102. In some examples, near-eye optical elements 110A and 110B may appear transparent to the user to facilitate augmented reality or mixed reality such that the user can view visible scene light 191 from the environment while also receiving display light generated by the digital projectors 108A/108B. In further examples, some or all of the near-eye optical elements 110A and 110B may be incorporated into a virtual reality headset where the transparent nature of the near-eye optical elements 110A and 110B allows the user to view an electronic display (e.g., a liquid crystal display (LCD), an organic light emitting diode (OLED) display, a micro-LED display, etc.) incorporated in the virtual reality headset.

In some implementations, near-eye optical elements 110A/110B may each include one or more optical layers and/or coatings. For example, near-eye optical element 110A may include an illumination layer, an optical combiner layer, a lens, a filter layer, and so on. The optional illumination layer may include one or more in-field light sources that are configured to emit non-visible light towards the eyeward side 109 for eye-tracking purposes. In other examples, head mounted device 100 may include one or more light sources disposed outside the field-of-view of the user, such as around a periphery of the near-eye optical element 110A (e.g., incorporated within or near the rim of frame 102).

An optional filter layer of the near-eye optical element 110A may be configured to block/prevent non-visible light received from the backside 111. The optional lens of the near-eye optical element may have a curvature for focusing light (e.g., display light and/or scene light) to the eye of the user. The near-eye optical element 110A may also include an optional optical combiner layer that is configured to receive display light that is generated by the digital projector 108A and to direct the display light towards the eyeward side 109 for presentation to the user. In some aspects, the optical combiner layer is transmissive to visible light, such as scene light 191 incident on the backside 111 of the near-eye optical element 110A. In some examples, the optical combiner layer may be configured as a volume hologram and/or may include one or more diffraction gratings (e.g., Bragg, blazed, uniform, etc.) for directing the display light towards the eyeward side 109. In some examples, the optical combiner layer includes a polarization-selective hologram (a.k.a. polarized volume hologram) that diffracts a particular polarization orientation of incident light while passing other polarization orientations. In other examples, the optical combiner layer includes one or more Fresnel optical elements that are configured to direct the display light towards the eyeward side 109 while also allowing visible light to propagate through the near-eye optical element 110A. By way of example a Fresnel optical element, included in the optical combiner layer, may include active surfaces that are selectively coated with a "hot mirror" layer (reflecting display light and passing scene light) to direct display light to the eyeward side 109 while also passing scene light for viewing by the wearer of the head-mounted device 100. In yet another example, the optical combiner layer may include an optical waveguide, such as a light tube/pipe for receiving the display light from the digital projector 109A and redirecting the display light towards the eyeward side 109.

As shown in FIG. 1, frame 102 is coupled to temple arms 104A and 104B for securing the head-mounted device 100 to the head of a user. Example head-mounted device 100 may also include supporting hardware incorporated into the frame 102 and/or temple arms 104A and 104B. The hardware of head-mounted device 100 may include any of processing logic, wired and/or wireless data interfaces for sending and receiving data, graphic processors, and one or more memories for storing data and computer-executable instructions. In one example, head-mounted device 100 may be configured to receive wired power and/or may be configured to be powered by one or more batteries. In addition, head-mounted device 100 may be configured to receive wired and/or wireless data including video data.

Figure 2A:
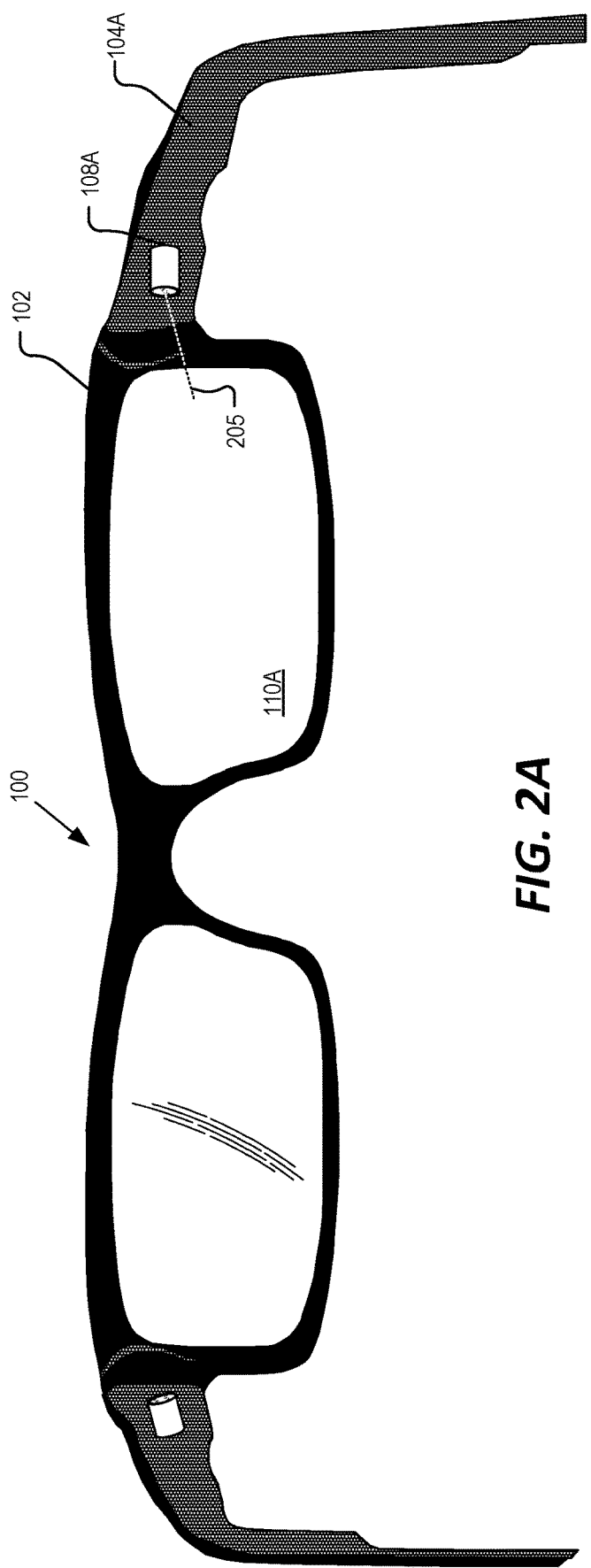
FIG. 2A illustrates an example eyeward side view of the head mounted device of FIG. 1, in accordance with aspects of the present disclosure.

FIG. 2A illustrates an eyeward side view of head mounted device 100. As shown in FIG. 2A, the digital projector 108A is configured to generate display light 205 that is directed to the near-eye optical element 110A. In some aspects, the size of the field-of-view provided by the digital projector 108A is determined by the design of an optical assembly included in the digital projector 108A as well by the positioning of the digital projector 108A with respect to the near-eye optical element 110A.

Figure 2B:
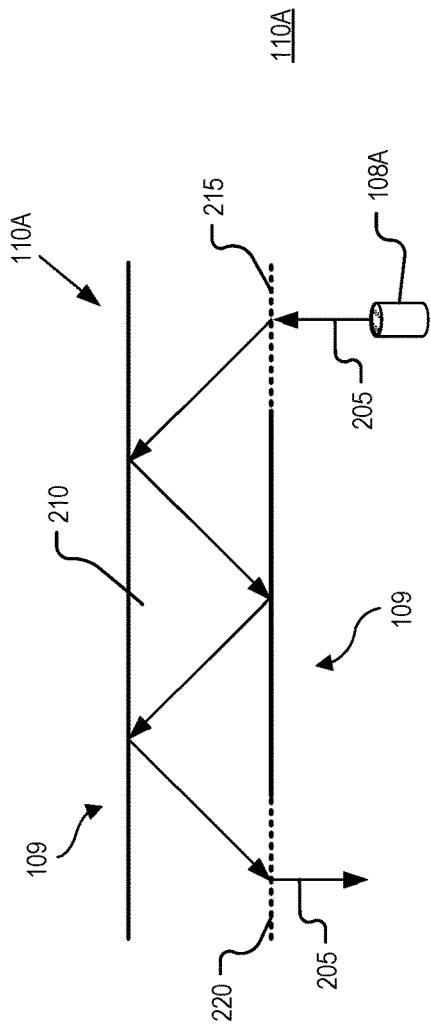
FIG. 2B illustrates a cross-sectional view of the near-eye optical element of FIG. 2A.

FIG. 2B illustrates a cross-sectional view of an example implementation of the near-eye optical element 110A. As shown in FIG. 2B, the near-eye optical element 110A may include an optical waveguide 210. The optical waveguide 210 may be a light tube/pipe that is configured to receive the display light 205. In some aspects, the digital projector 108A is configured to form an image for display at infinity (i.e., a field point becomes a plane wave). The illustrated example of optical waveguide 210 is shown as including an input coupler 215 that is configured to couple the display light 205 received from the digital projector 108A into the optical waveguide 210. The display light 205 then propagates within the optical waveguide 210 via total internal reflection (TIR), where the display light 205 then exits the optical waveguide 210 via an output coupler 220 (e.g., a grating) towards the eyeward side 109.

Figure 3:
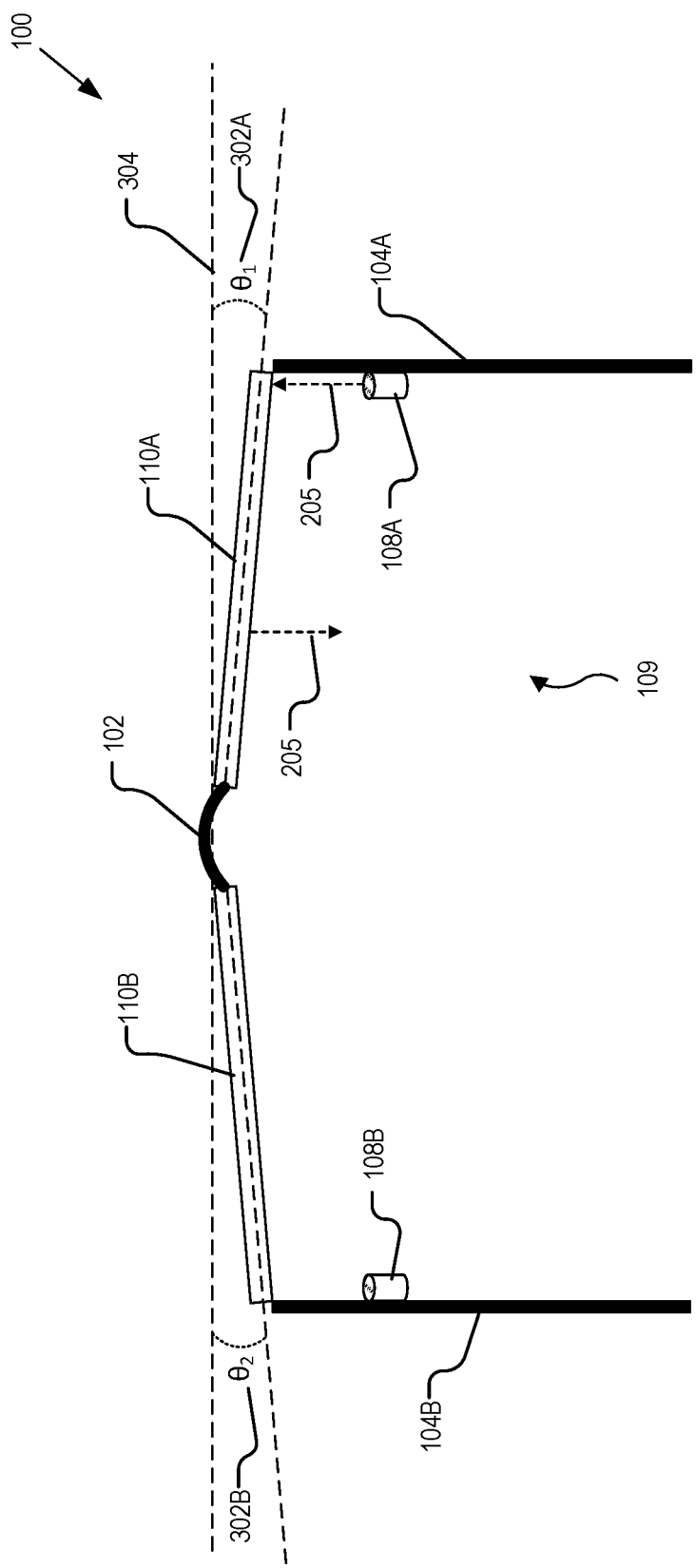
FIG. 3 illustrates a frame wrap angle of the near-eye optical elements of the head mounted device of FIG. 1, in accordance with aspects of the present disclosure.

FIG. 3 illustrates a top-view of the head-mounted device 100. As shown, digital projector 108A is fixed to the temple arm 104A and generates display light 205 towards near-eye optical element 110A, which then redirects the display light 205 towards the eyeward side 109 to provide a field-of-view. FIG. 3 also illustrates the near-eye optical elements 110A and 110B secured within the frame 102 at non-zero frame wrap angles (e.g., frame wrap angle $\theta_1$ 302A and frame wrap angle $\theta 2$ 302B). In some aspects, "frame wrap angle" may refer to the horizontal angle of the lens plane in front of the eyes. In the example of FIG. 3, the frame wrap angle may be the angle between the baseline 304 and a line tangent to the nasal and temporal limits of each near-eye optical element 110A/110B. The frame wrap angle is a non-yoked measurement, meaning the frame wrap angle $\theta_1$ 302A is opposite the frame wrap angle $\theta_2$ 302B.

In some implementations, the frame wrap angle $\theta_1$ 302A and frame wrap angle $\theta_2$ 302B are each several degrees (e.g., in the range of 5 to 7 degrees). The non-zero frame wrap angles are typically provided in the head-mounted device 100 for user comfort as well as to improve the outward appearance of the system. Increases in the frame wrap angle of the near-eye optical elements 110A/110B increases the field-of-view provided by the digital projector. However, in conventional systems, increasing in the size of the field-of-view may result in an increase in the optical aberrations. This is because the optical aberrations induced by some lenses included in a conventional digital projector may increase with increases in the field-of-view. In fact, some lenses, such as rotationally-symmetric lenses, may induce optical aberrations that have a nonlinear (e.g., 3rd order and higher) dependence on the field-of-view. Thus, designing lenses for an optical assembly to accommodate a large field-of-view may increase the optical aberrations observed by the user.

Accordingly, aspects of the present disclosure include providing a field bias optical element within the optical assembly of the digital projectors 108A/108B. The field bias optical element may allow the lenses of the optical assembly of the digital projector to be designed for a smaller field-of-view (with less optical aberrations), while still providing an effectively larger field-of-view that corresponds to the angle and positioning of the near-eye optical elements. As will be described in more detail below, the field bias optical element may be provided by way of a prism, a transparent material with graduated refractive index, a diffractive optical element, or some combination thereof.

Figure 4:
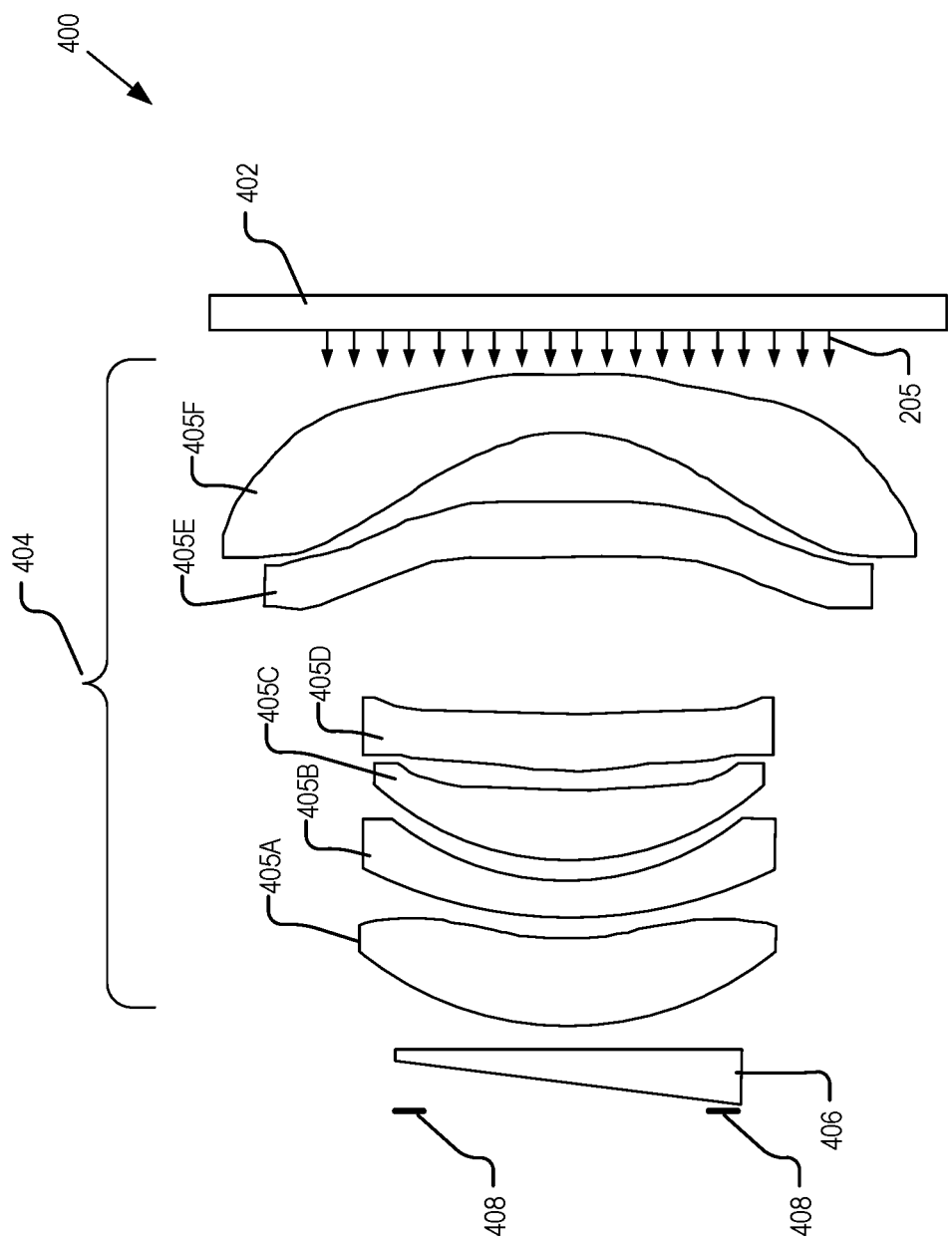
FIG. 4 illustrates an example optical assembly of a digital projector, in accordance with aspects of the present disclosure.

FIG. 4 illustrates an example optical assembly of a digital projector 400, in accordance with aspects of the present disclosure. The illustrated example of digital projector 400 is shown as including a display 402, a lens assembly 404, a field bias optical element 406, and an aperture stop 408. Digital projector 400 is one possible example of digital projectors 108A/108B of FIGS. 1-3. In some aspects, the lens assembly 404 and field bias optical element 406 may, collectively, be referred to as the optical assembly of digital projector 400.

Figure 5:
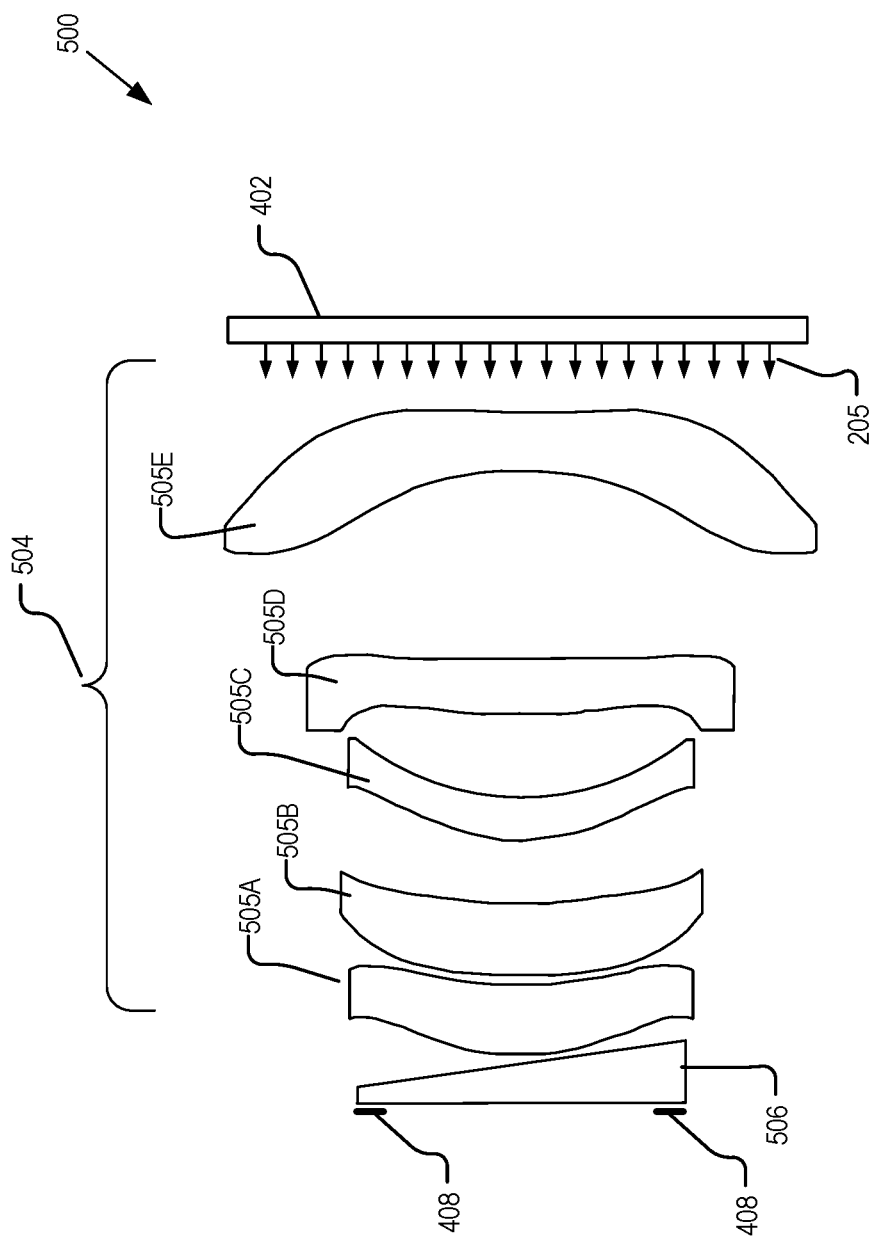
FIG. 5 illustrates another example optical assembly of a digital projector, in accordance with aspects of the present disclosure.

As shown in FIG. 4, the display 402 is configured to generate display light 205. In some embodiments, display 402 may be a digital micro mirror device (DMD), a liquid-crystal-on-silicon (LCOS) device, a micro light emitting diode (uLED) device, or other electronic display device. The lens assembly 404 is configured to receive the display light 205 and to direct the display light 205 along an optical path. The illustrated example of lens assembly 404 is shown as including multiple lenses 405A-405F. In some aspects, the lenses 405A-405F of lens assembly 404 are configured to provide a first field-of-view. That is, the lenses of the lens assembly 404 may be designed for a field-of-view that is less than the effective field-of-view provided by the digital projector 400 such that the optical aberrations induced by the lenses are lower than if the lenses were designed with the larger effective field-of-view that is ultimately provided by the digital projector 400. Furthermore, in some examples, one or more of the lenses 405A-405F are rotationally symmetric. Although FIG. 4 illustrates lens assembly 404 as including six (6) lenses 405A-405F, the lens assembly 404 may include any number of lenses including one or more. By way of example, FIG. 5 illustrates another example digital projector 500 that includes a lens assembly 504 that utilizes five (5) lenses 505A-505E in conjunction with field bias optical element 506.

Referring back to FIG. 4, the field bias optical element 406 is shown as being disposed between the lens assembly 404 and the aperture stop 408. In some aspects, the field bias optical element 406 is configured to bias the display light 205 in at least one direction. For example, referring back to FIG. 3, the field bias optical element 406 may bias the display light 205 towards a nasal region of the near-eye optical element 110A (e.g., bias in a direction away from the temple arm 104A). In operation, the biasing of the display light 205 by the field bias optical element 406 provides a second field-of-view that is larger than the first field-of-view (e.g., the field bias optical element 406 provides an effective field-of-view that is larger than the field-of-view that the lens assembly 404 is designed to accommodate).

Figure 6:
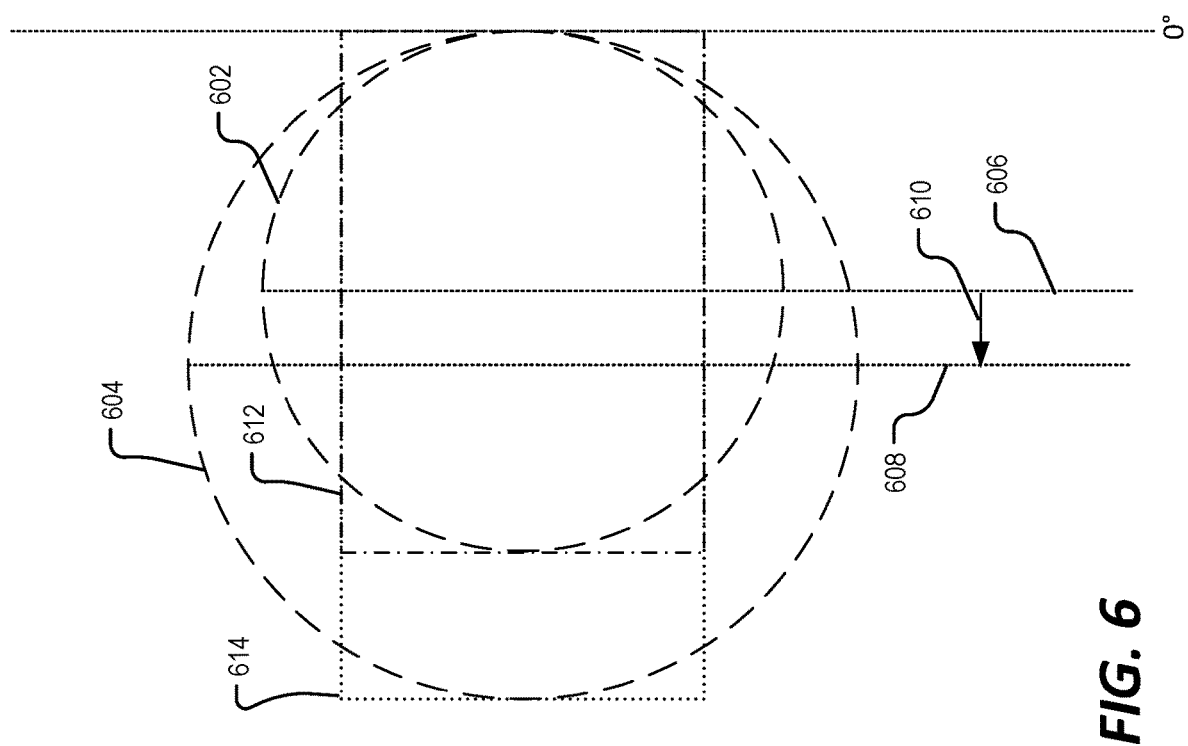
FIG. 6 illustrates an increase of the field-of-view provided by a field bias optical element, in accordance with aspects of the present disclosure.

FIG. 6 illustrates field-of-view 602 and field-of-view 604 illustrated in angular space. The example field-of-view 604 is an effective or actual field-of-view that is provided by a digital projector (e.g., digital projector 400 of FIG. 4) by way of a field bias optical element, such as field bias optical element 406 of FIG. 4, whereas field-of-view 602 represents the field-of-view that the lenses of the digital projector's lens assembly are designed to accommodate. As shown, the field-of-view 602 is smaller than the effective field-of-view 604. As discussed above, designing the lenses for a smaller field-of-view, such as field-of-view 602 may reduce the optical aberrations caused by the lenses of the digital projector. In one example, the effective field-of-view 604 has a diameter that is several degrees (e.g., around 5 degrees) larger than a diameter of the field-of-view 602.

FIG. 6 also illustrates display region 612 and display region 614 corresponding to field-of-view 602 and field-of-view 604, respectively. Display region 612 includes a centerline 606 and display region 614 includes a centerline 608. FIG. 6 also shows the biasing 610 of the effective field-of-view 604 and thus the biasing of the display region 614.

FIGS. 7A-7D illustrate example field bias optical elements 702A-702D, in accordance with aspects of the present disclosure. The field bias optical elements 702A-702D are example field bias optical elements that may be incorporated into any of the digital projectors discussed herein. Each of the field bias optical elements 702A-702D may be formed from a transparent material, such as plastic, glass, or crystal.

Figure 7D:
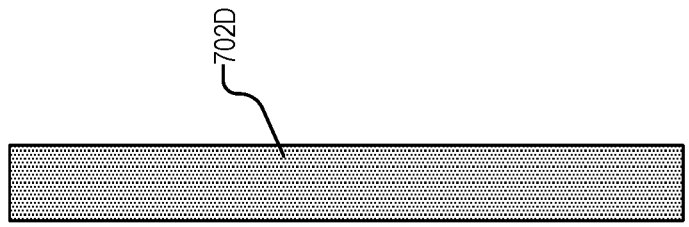
FIGS. 7A-7D illustrate example field bias optical elements, in accordance with aspects of the present disclosure.
Figure 7C:
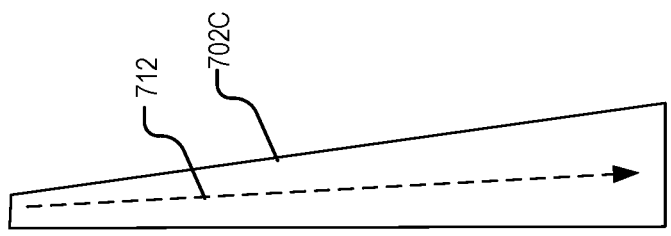
Figure 7B:
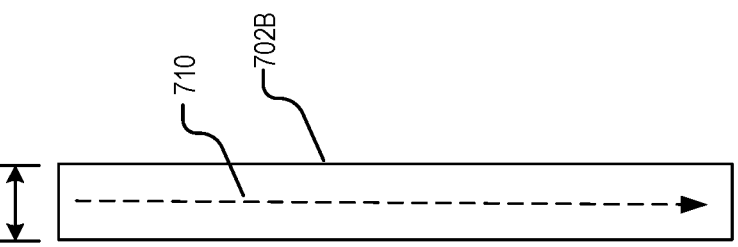
Figure 7A:
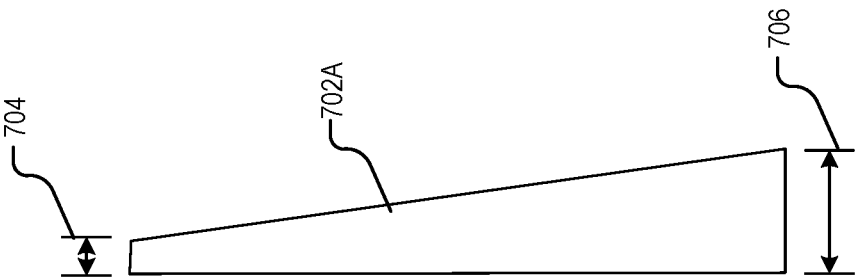

Referring first to FIG. 7A, field bias optical element 702A is shown as a prism and may include a quadrilateral or trapezoidal cross-section. In some examples, the field bias optical element 702A includes a varying thickness of the transparent material to bias the display light. For example, field bias optical element 702A is shown as including a first thickness 704 on one end of the field bias optical element, where the thickness gradually increases to a second thickness 706 on an opposite end of the field bias optical element 702A. In some aspects, the transparent material of field bias optical element 702A has a single (e.g., constant) refractive index.

FIG. 7B illustrates another example of a field bias optical element 702B. The field bias optical element 702B is shown as being formed from a transparent material that includes a constant thickness 708 and a graduated refractive index 710. That is, in some examples, the transparent material of field bias optical element 702B may be configured to include a refractive index that gradually increases from one end of the field bias optical element 702B an opposite end. In some aspects, the graduated refractive index 710 is configured to bias the display light in at least one direction.

FIG. 7C illustrates a field bias optical element 702C that is configured as a prism (e.g., varying thickness) as well as having a graduated refractive index 712.

FIG. 7D illustrates a field bias optical element 702D that is a diffractive optical element (DOE). In some aspects, the DOE of field bias optical element 702D is configured to bias display light, as discussed above. In some examples, the DOE may be configured as a volume hologram and/or may include one or more diffraction gratings (e.g., Bragg, blazed, uniform, etc.) that are configured to bias the display light in one or more directions.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A digital projector, comprising:
a display configured to generate display light;
at least one lens disposed to receive the display light and to direct the display light along an optical path, wherein the at least one lens is configured to provide a first field-of-view; and
a field bias optical element disposed between the at least one lens and an aperture stop, wherein the field bias optical element is configured to bias the display light in at least one direction toward a nasal region of a head mounted device (HMD) to provide a second field-of-view that is greater than the first field-of-view, wherein the field bias optical element is to be positioned in a temple arm of the digital projector of the HMD to increase the second-field-of-view in a non-sequential manner and formed with a thickness and a graduated refractive index to provide the second field-of-view.

2. The digital projector of claim 1, wherein the at least one lens is rotationally symmetric.

3. The digital projector of claim 1, wherein the field bias optical element comprises a transparent material of plastic, glass, or crystal.

4. The digital projector of claim 3, wherein the field bias optical element comprises a prism.

5. The digital projector of claim 4, wherein the prism includes a varying thickness of the transparent material to bias the display light in the at least one direction.

6. The digital projector of claim 5, wherein the transparent material includes a graduated refractive index.

7. The digital projector of claim 3, wherein the transparent material of the field bias optical element has a constant thickness and a graduated refractive index to bias the display light in the at least one direction.

8. The digital projector of claim 1, wherein the field bias optical element comprises a diffractive optical element in combination with a refractive element configured to bias the display light in the at least one direction.

9. The digital projector of claim 1, wherein the display comprises a digital micro mirror device (DMD), a liquid-crystal-on-silicon (LCOS) device, or a micro light emitting diode (uLED) device.

10. An optical assembly for a digital projector, the optical assembly comprising:
a display configured to generate display light;
at least one lens disposed to receive the display light generated by a display and to direct the display light along an optical path, wherein the at least one lens is configured to provide a first field-of-view; and
a field bias optical element disposed between the at least one lens and an aperture stop, wherein the field bias optical element is configured to bias the display light in at least one direction toward a nasal region of a head mounted device (HMD) to provide a second field-of-view that is greater than the first field-of-view, wherein the field bias optical element is to be positioned in the digital projector in a temple arm of the HMD to increase the second-field-of-view in a non-sequential manner and is formed with a thickness and a graduated refractive index to provide the second field-of-view.

11. The optical assembly of claim 10, wherein the field bias optical element comprises a prism, wherein the prism includes a varying thickness of transparent material to bias the display light in the at least one direction.

12. The optical assembly of claim 10, wherein the field bias optical element comprises a transparent material that has a constant thickness and a graduated refractive index to bias the display light in the at least one direction.

13. The optical assembly of claim 10, wherein the field bias optical element comprises a diffractive optical element in combination with a refractive element configured to bias the display light in the at least one direction.

14. The optical assembly of claim 10, wherein the at least one lens is rotationally symmetric.

15. The optical assembly of claim 10, wherein the field bias optical element comprises a transparent material of plastic, glass, or crystal.

16. A head-mounted device, comprising:
a frame;
a temple arm coupled to the frame;
a digital projector coupled to the temple arm; and
a near-eye optical element secured within the frame, wherein the near-eye optical element is configured to receive display light generated by the digital projector and to direct the display light toward an eyeward side of the near-eye optical element, wherein the digital projector includes:
a display configured to generate the display light;
at least one lens disposed to receive the display light and to direct the display light toward an aperture stop, wherein the at least one lens is configured to provide a first field-of-view; and
a field bias optical element disposed between the at least one lens and the aperture stop, wherein the field bias optical element is configured to bias the display light in at least one direction towards a nasal region of the head mounted device (HMD) to provide a second field-of-view that is greater than the first field-of-view, wherein the field bias optical element is to be positioned in the digital projector in a temple arm of the HMD to increase the second-field-of-view in a non-sequential manner and is formed with a thickness and graduated refractive index to provide the second field-of-view.

17. The head-mounted device of claim 16, wherein the optical assembly is secured within the frame to provide a non-zero frame wrap angle.

18. The head-mounted device of claim 16, wherein the field bias optical element comprises a transparent material that has a varying thickness or a graduated refractive index to bias the display light in the at least one direction.

19. The head-mounted device of claim 16, wherein the field bias optical element further comprises a diffractive optical element in combination with a refractive optical element configured to bias the display light in the at least one direction.

* * * * *